United States Patent [19]

Getsch

[11] 4,055,933
[45] Nov. 1, 1977

[54] APPARATUS FOR PACKAGING PHOTOGRAPHIC SLIDES IN ENVELOPES

[75] Inventor: Edward W. Getsch, Minneapolis, Minn.

[73] Assignee: Pako Corporation, Minneapolis, Minn.

[21] Appl. No.: 608,836

[22] Filed: Aug. 29, 1975

[51] Int. Cl.² .................. B65B 5/04; B65B 43/12; B65B 43/26
[52] U.S. Cl. .................................... 53/187; 53/384
[58] Field of Search ............... 53/29, 35, 183, 187, 53/244, 246, 252, 384; 156/108, 514; 221/270; 40/158 B, 159

[56] References Cited

U.S. PATENT DOCUMENTS

| | | | |
|---|---|---|---|
| 2,139,039 | 12/1938 | Salfisberg | 53/183 X |
| 3,733,770 | 5/1973 | Erickson et al. | 53/183 X |
| 3,788,031 | 1/1974 | Florjancic | 53/252 X |
| 3,896,603 | 7/1975 | Tout | 53/384 X |

*Primary Examiner*—Robert Louis Spruill
*Attorney, Agent, or Firm*—John W. Adams

[57] ABSTRACT

A flexible transparent envelope for packaging photographic slides which has opposed inwardly opening pockets with means for attaching the envelope package along with other similar envelopes along one marginal edge thereof into a book or folder for easy inspection and compact storage, said invention also including a machine which folds the slide-packaging envelope along its longitudinal center line to expose the inner open ends of the pockets on both sides of said center line and successively inserts said slides into said pockets in assembly line fashion as said slides are delivered by a conventional slide machine, such as the "Pakon" mounter manufactured by Pako Corporation, Minneapolis, Minnesota, the assignee hereunder. The invention also relates to the method of packaging the slides in said envelopes.

5 Claims, 7 Drawing Figures

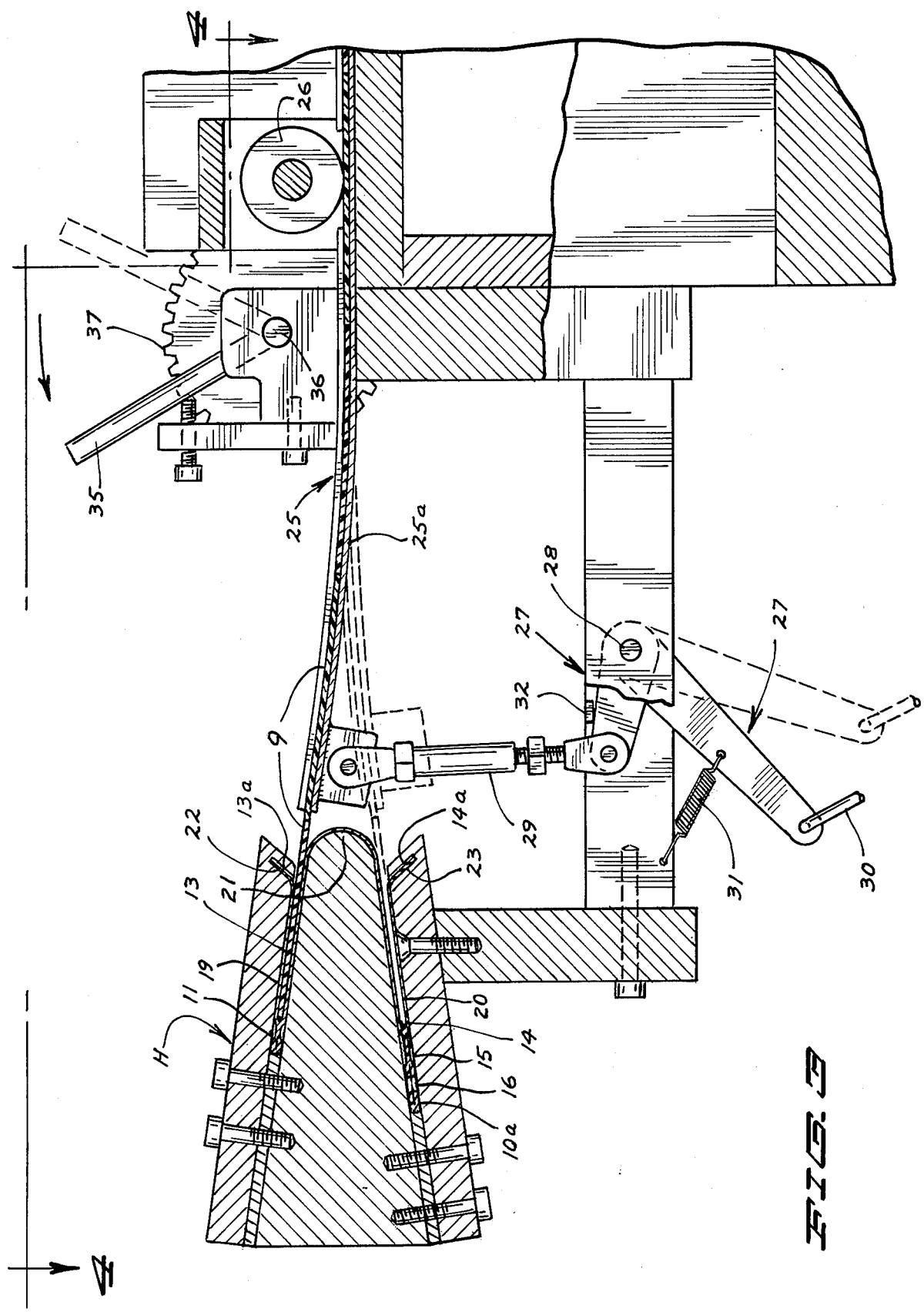

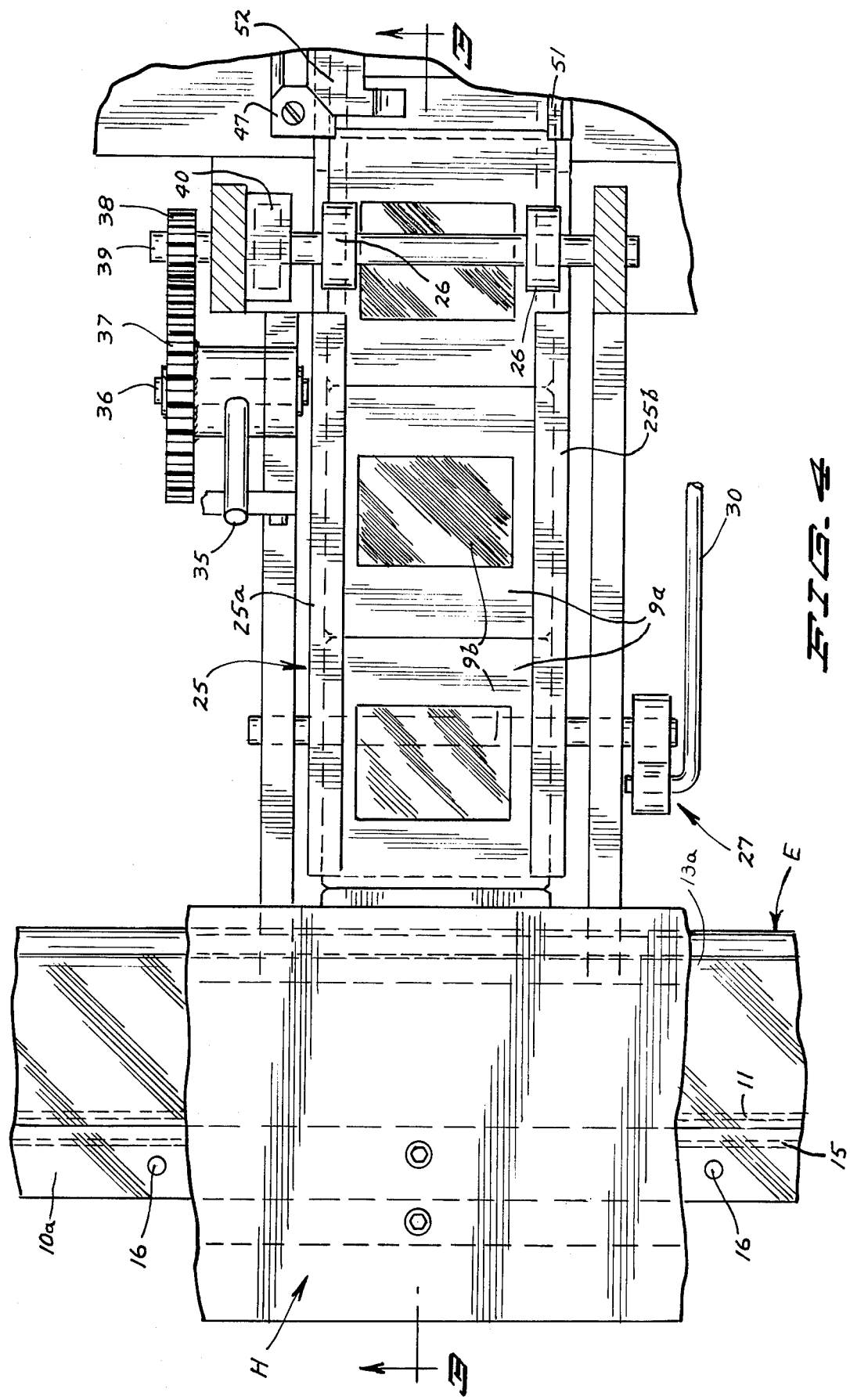

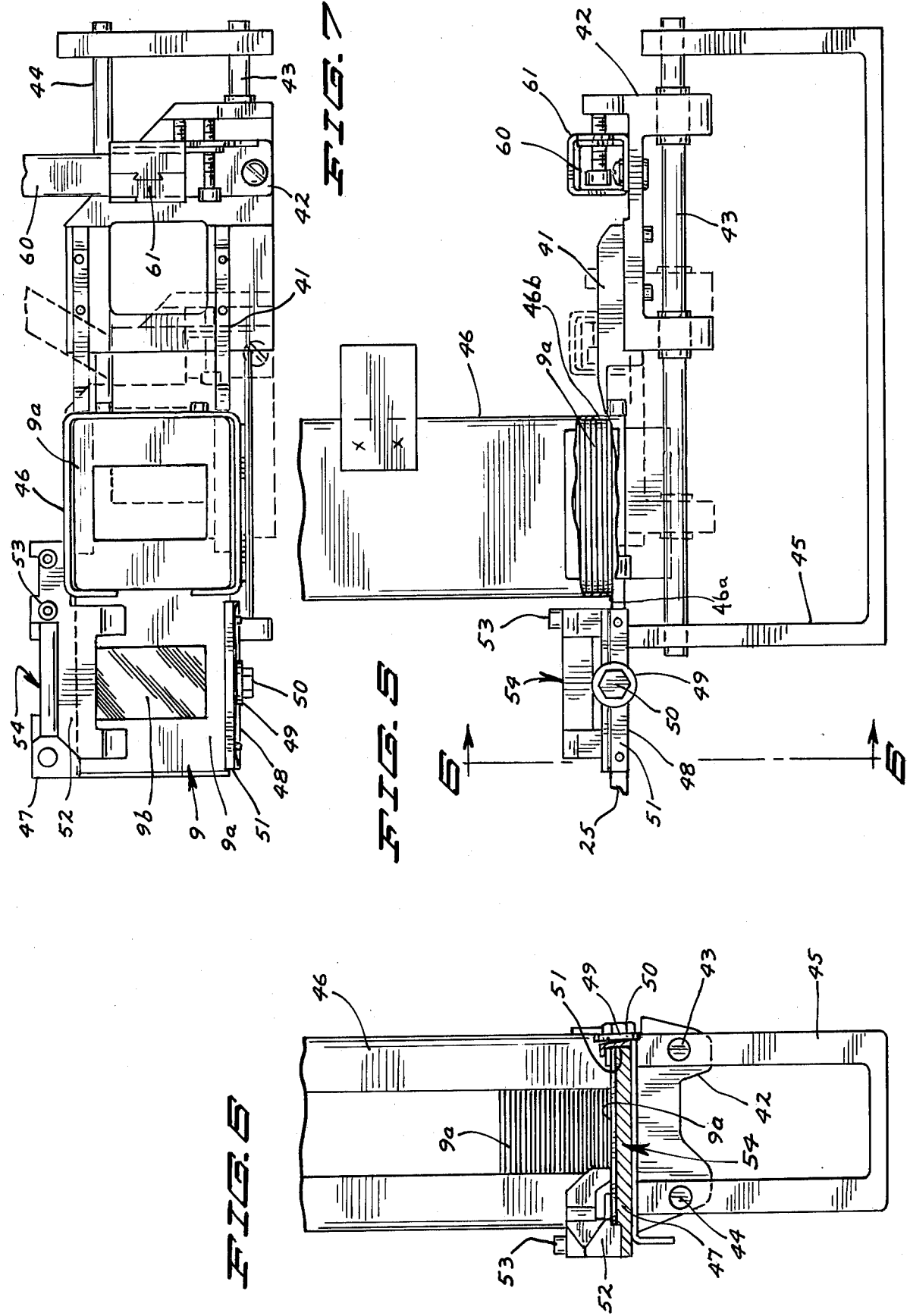

APPARATUS FOR PACKAGING PHOTOGRAPHIC SLIDES IN ENVELOPES

In the past, transparent photographic slides have been packaged in boxes after the photographic transparency is mounted in a slide mounting frame. This does not permit easy and quick visual examination and identification of the slides and thus makes it difficult to select a particular slide from a group in the box.

It is an object of the invention, therefore, to provide a transparent package which will permit compact storage and also rapid inspection and examination of the slides without removing the same from the transparent envelope pockets in which they are packaged, thus reducing dust accumulation and scratches on said slides which are caused by conventional storage and examination means.

It is further an object to provide a relatively simple yet efficient machine and method for packaging the slides in the respective envelope pockets.

These and other objects and advantages of this invention will be apparent from the following description made in connection with the accompanying drawing wherein like reference characters refer to similar parts throughout the several views, and in which:

FIG. 3 is a vertical sectional view taken substantially along the line 3—3 of FIG. 4 and showing the envelope holding and positioning head of said machine;

FIG. 4 is a top plan view of the slide feeding and guiding mechanism;

FIG. 5 is a side elevational view of the slide mounting apparatus;

FIG. 6 is a transverse vertical sectional view of said slide mounting apparatus taken substantially along line 6—6 of FIG. 5; and FIG. 7 is a top plan view of said slide mounting apparatus.

Figure 1:
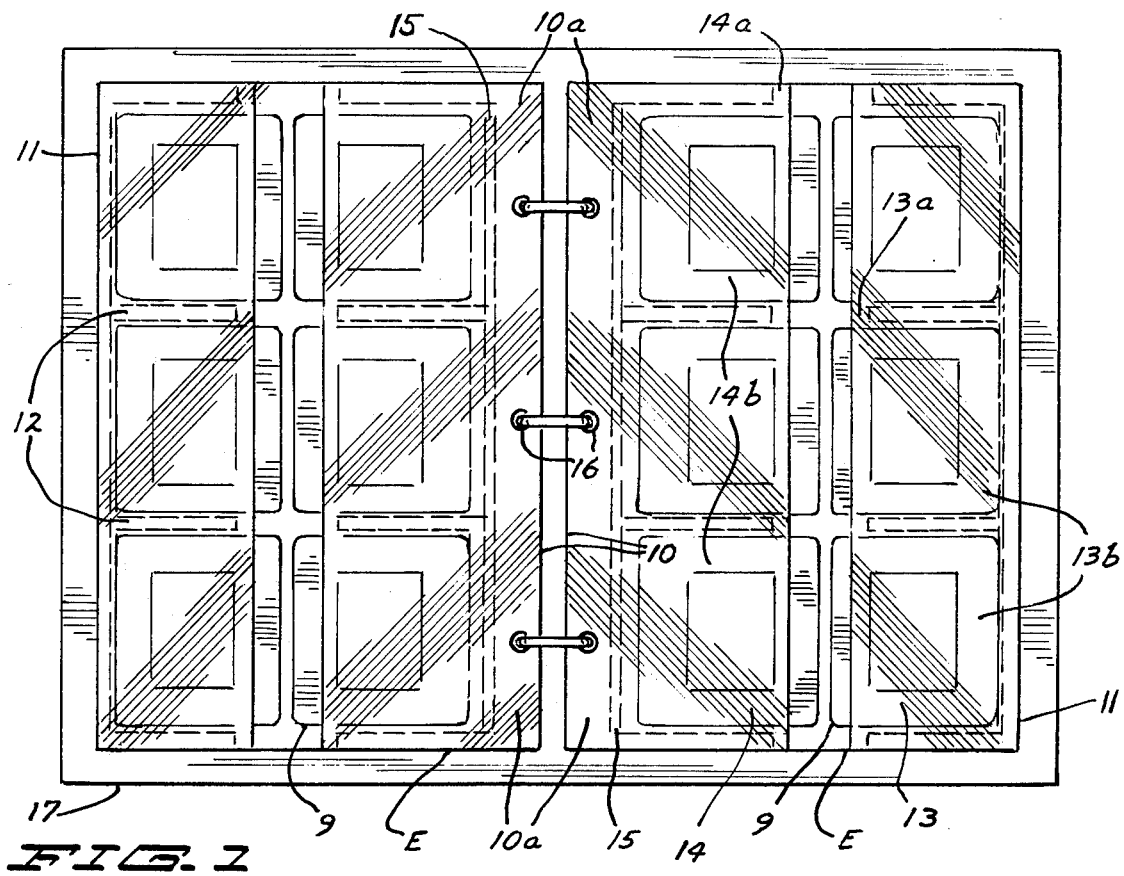
FIG. 1 is a top plan view showing a plurality of slide packaging envelopes attached in a loose leaf ring binder for storage.
Figure 2:
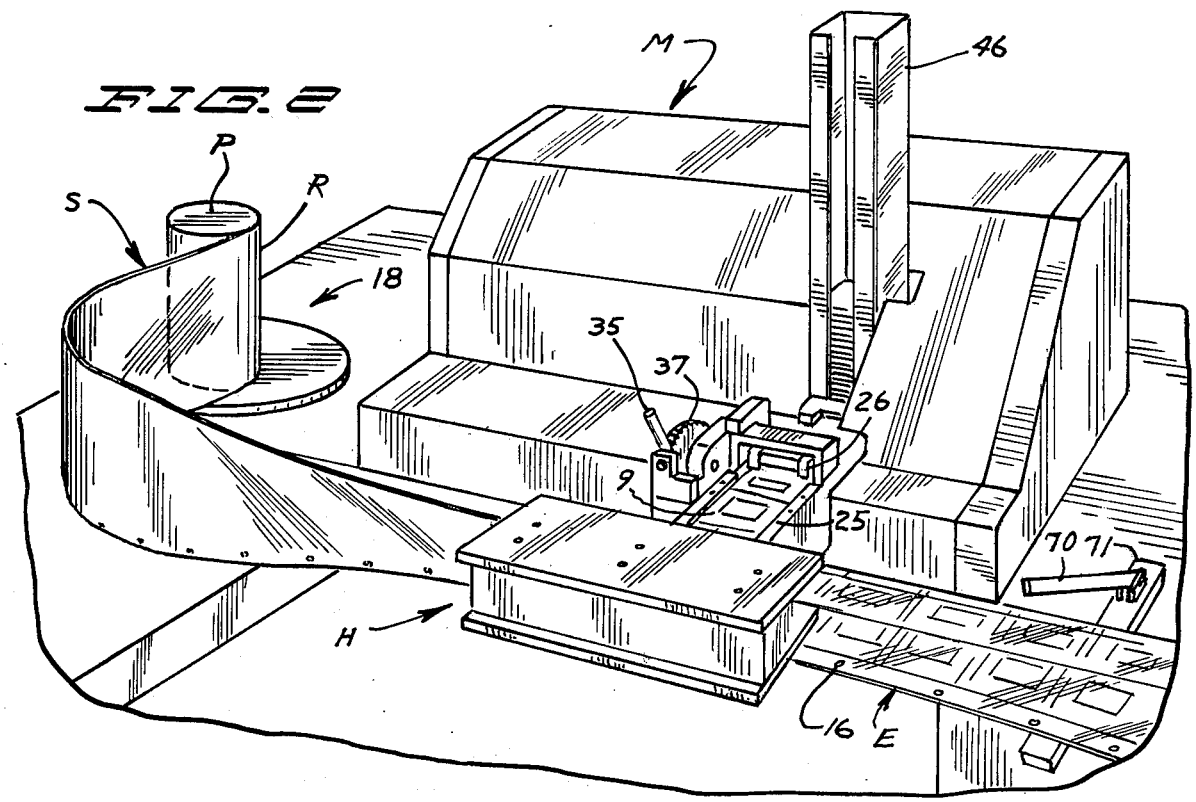
FIG. 2 is a perspective view of my apparatus for packaging said slides as attached to a slide mounting machine.

A mounting machine such as "Pakon" Slide Mounter manufactured by Pako Corporation, assignee of the instant application, is illustrated in FIG. 2 and is designated as an entirety by the letter M. A number of multiple pocket packaging envelopes E are shown in FIG. 1, each of which includes six pockets. Said envelopes E are formed from a suitable continuous strip 5 of transparent flexible sheet material, such as polyethelene or the like, which can be easily folded along fold lines 10 and 11 and heat sealed to form the opposed rows 13 and 14 which respectively include the individual pockets 13b and 14b formed by a plurality of transverse pocket-forming heat seal lines 12. The inner ends of the heat seal lines 12 respectively terminate in spaced relation to the inner opposed edges of the polyethelene to respectively form guide flaps 13a and 14a at the inner mouth openings of the respective pockets, 13b and 14b.

In the form shown, the outer fold line 10 has a longitudinal heat seal line 15 disposed in an inwardly spaced parallel relation thereto and suitable means for attaching a plurality of envelopes E together, such as the ring receiving punched holed 16, are provided in the marginal edge portion 10a between fold line 10 and heat seal line 15. This permits a number of envelopes to be stored in a hard back ring binder 17, such as is illustrated in FIG. 1.

Referring to FIG. 2, the packaging envelopes E are provided in a continuous supply roll R mounted on a suitable spindle pin P and the continuous strip S passes around an upstanding guiding pulley 18 and into a bending and positioning head H.

As best shown in FIG. 3, the positioning head H has a pair of slots 19 and 20 formed therein with a rounded outwardly projecting bending edge portion 21 therebetween. The pocket rows 13 and 14 of continuous envelope strip S are respectively guided into the slots 19 and 20 and form a longitudinal fold line around the rounded projecting folding edge portion 21. It will be seen that the slot 20 is slightly longer than the slot 19 to receive the attachment edge portion 10a having the holes 16 formed therein. A pair of flap receiving slots 22 and 23 are formed in the head H at the outer end portions of the slots 19 and 20 to respectively receive and spread the two guide flaps 13a and 14a at the respective inner mouth openings of the pockets 13b and 14b as the continuous strip S is fed through the slots 19 and 20 in the head H to open the mouths of the pockets 13b and 14b and facilitate insertion of the mounted slides 9 into the respective pockets 13b and 14b.

As shown in FIGS. 4 and 5, the mounted slides are delivered in edge to edge abutment from a mounting station 54 to the fixed end of a transfer track 25 which is mounted in closely spaced relation thereto, having a pair of opposed grooved rails 25a and 25b. The mounted slides 9 are then moved along track 25 by the delivery mechanism of the slide mounting machine M (to be described hereinafter). As best shown in FIG. 3, the rails 25a and 25b are mounted in cantilever fashion and are made from flexible material to permit the free cantilevered ends thereof to be selectively shifted into alignment with the two pocket rows 13 and 14 being held in the head H. A suitable track shifting mechanism is provided and comprises a bell crank 27, mounted on a rock shaft 28 with an adjustable length connector link 29 pivotally connected to the bottom of the free end portion of the cantilevered track 25. Suitable means for actuating the bell crank 27 may be provided, such as the foot operated link 30. The track 25 is normally held in its raised position as shown by full lines in FIG. 3, by suitable means such as the tension spring 31 which resiliently holds the bottom of said link 29 against the stop 32.

The following is a description of the delivery mechanism of the slide mounting machine M. As shown in FIG. 5, the bottom of a slide magazine 46 is attached to a base member 47. This magazine base member 47 is fixed in aligned spaced relationship to the supported end of the cantilevered transfer track 25 by a rigid support frame 45. Said support frame 45 has a pair of guide rails 43 and 44 fixed thereto. A fork mounting member 42 is slidably mounted upon said guides 43 and 44. A slide feeding fork 41 is attached to said member 42 in alignment with magazine base member 47 as shown. The bottom of said magazine 46 has a slide discharge opening 46a in front to allow the bottom slide mount 9a from said magazine to be fed into a mounting station 54 aligned wih said opening 46a and has a pair of fork receiving guide openings 46b in back to allow said slide feeding fork 41 to be received thereinto. An actuating lever 60 connected to said member 42 by means of a housing 61 in the manner shown is moved into dotted position (FIG. 5) by suitable means (not shown) provided in mounting machine M towards magazine 46, thus causing said fork mounting member 42 to move along said guides 43 and 44 and drive slide fork 41 into engagement with the bottom slide mount 9a in the magazine 46 and push said bottom slide mount 9a into the mounting station 54 aligned therewith. Said lever 60 is then moved back by by said actuating means away from said magazine 46, causing the mounting member 42 and fork 41 to return to their original position to be moved into said station 54 when said fork 41 is again actuated. Said slide mounting station 54 of mounting machine M (the details of which are not shown) is attached to said base member 47, and the slide mounts 9a are held therein by a pair of grooved track elements 51 and 52 during insertion of the slide transparency 9b into the mount by the machine M. When fork 41 is actuated, it moves the next slide mount 9a into the slide mounting station 54, causing the mounted slide 9 to be ejected through said track elements 51 and 52 and into the transfer track 25.

A suitable last slide feeding device is shown in FIG. 3, which is comprised of a manually operated handle 35 fixed to a shaft 36 which rotates a ring gear 37 which in turn meshes with a pinion 38 fixed to a shaft 39 which drives the rollers 26 through a one-way clutch 40. When the last slide mount 9a contained in magazine 46 is driven by fork 41 into said station 54, there is no remaining slide mount 9a to force that slide mount of of said station 54; however the mounted slide 9 immediately ahead of this last slide is discharged into track 25 by manual operation of handle 35.

Suitable means (not shown) may be provided for automatically advancing the continuous envelope strip S through the slots 19 and 20 in the head H, and suitable cut-off means are shown in FIG. 2 comprising a knife 70 movably attached to a platform 71, and actuated manually to cut the continuous envelope strip into the desired lengths, such as the three-slide lengths illustrated in FIG. 1, whereby each envelope length will contain 2 rows of 3 slides each.

As the slides are received into the track 25 from the mounting machine, they are individually fed one-at-a-time into the pockets of 13b and 14b of the envelope strip S which are aligned with the free cantilevered end of said track 25, as best shown in FIG. 3. The slides 9 are moved forward in the track 25 in the manner previously described and delivered into the respectively aligned pockets of the envelope held in the slots 19 and 20 of the head H. After a slide 9 has been fed into envelope pocket being held in the upper slot 20, the foot operated link 30 is actuated to move the slide down into the broken line position shown in FIG. 3, and the next slide 9 is inserted into the pocket held in the lower slot 19. The flap receiving slots 22 and 23 hold the guide flaps 13a and 14a in spread apart relation to open the mouth of each of a pair of opposed pockets 13b and 14b respectively. After the two slides 9 have been inserted into the respectively aligned pockets 13b and 14b, the continuous strip S is advanced to align the next pair of pockets with the guide track 25.

The method of packaging mounted photographic slides comprises providing a packaging envelope strip having opposed spaced apart slidereceiving pockets with inwardly facing mouth openings, bending said strip along a longitudinal line disposed between said opposed mouth openings, and inserting mounted slides into the pockets while said strip is bent along said longitudinal line. The guide flap portion provided at the mouth of each envelope pocket is also spread apart to facilitate insertion of the mounted slide therein.

It will be seen that I have provided a relatively simple yet highly efficient transparent slide packaging envelope along with a method and apparatus for packaging mounted slides in said envelopes.

It will, of course, be understood that various changes may be made in the form, details, arrangement and proportions of the parts without departing from the scope of this invention as set forth in the appended claims.

What is claimed is:

1. For use with a photographic slide mounting machine of the type having means for mounting slide transparencies in a supporting frame and means to eject the mounted slides from said machine; apparatus for packaging in a single multi-pocket envelope a plurality of such mounted slides, said apparatus comprising:

means supplying a continuous flexible strip of envelope material formed to define a pair of spaced apart parallel rows of connected pockets, each row including a plurality of pockets arranged in opposed spaced apart relation to the pockets of the other row to form opposed pairs of pockets having inwardly facing slide-receiving mouth openings, a positioning head defining a packaging station and having said flexible strip slidably mounted thereon with means for holding said strip in doubled-back substantially U-shaped position to simultaneously expose the opposed mouth openings of a selected pair of pockets positioned at said packaging station, a shiftable guide track for transporting mounted slides from the ejecting means of the slide mounting machine to the packaging station and including means for selectively aligning said track with the mouth opening of one of said pockets to permit insertion of the slides successively into said respective pockets of said envelope from the slide ejecting means, and means for presenting successive pairs of pockets at said packaging station.

2. The apparatus set forth in claim 1 and means to cut said strip into the desired package lengths.

3. The apparatus set forth in claim 1 and said positioning head comprising a pair of feed slots in spaced apart relation to each other adapted to slidably receive said packaging envelope strip so that said strip is bent along a longitudinal line disposed between said rows of pockets to permit alignment of said track with the pocket opening disposed at said station, and said feed slots of said head permitting advancement of the strip to present successive pockets at said station and permit insertion of mounted slides into said pockets from said track.

4. The apparatus claimed in claim 3 wherein said track comprises a pair of grooved rails constructed of flexible material positioned in close fixed relationship to each other, and mounted in cantilevered fashion to permit shifting the same into registration with the open mouths of the pockets disposed at said packaging station.

5. The apparatus claimed in claim 3 wherein said head further comprises a pair of guide flap slots extending obliquely outwardly from said feed slots, adapted to receive and spread said guide flaps thus facilitating the insertion of said mounted slides into said pockets.

* * * * *